(12) United States Patent
Brand

(10) Patent No.: US 6,947,042 B2
(45) Date of Patent: Sep. 20, 2005

(54) METHOD FOR MAPPING HIGH-DIMENSIONAL SAMPLES TO REDUCED-DIMENSIONAL MANIFOLDS

(75) Inventor: Matthew E. Brand, Newton, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 168 days.

(21) Appl. No.: 10/292,843

(22) Filed: Nov. 12, 2002

(65) Prior Publication Data

US 2004/0091152 A1 May 13, 2004

(51) Int. Cl.$^7$ ............................................. G06T 17/00
(52) U.S. Cl. ................................................... 345/428
(58) Field of Search ........................................ 345/428

(56) References Cited

PUBLICATIONS

Matthew Brand. Charting a manifold. Neural Information Processing Systems: Natural and Synthetic. 2002. http://www-2.cs.cmu.edu/Groups/NIPS/NIPS2002/NIPS2002preproceedings/papers/revised/AA61–draft.pdf.*
Joshua B. Tenenbaum. Mapping a manifold of perceptual observations. Neural Information Processing Systems. Cambridge, MIT Press. 1998.*
M. Balasubramanian et al., "The IsoMap algorithm and topological stability," Science, 295(5552):Jan. 7, 2002.
Bregler et al., "Nonlinear image interpolation using manifold learning," Advances in Neural Information Processing Systems, vol. 7, 1995.
DeMers et al., "Nonlinear Dimensionality Reduction," Advances in Neural Information Processing Systems, vol. 5, 1993.
Hastie et al., "Principal curves," J. Am. Statistical Assoc., 84(406):502–516, 1989.
Roweis et al., "Nonlinear Dimensionality Reduction By Locally Linear Embedding," Science, 290:2323–2326, Dec. 22, 2000.
Tenenbaum et al., "A Global Geometric Framework For Nonlinear Dimensionality Reduction," Science, 290:2319–2323, Dec. 22, 2000.
Smola et al., "Regularized Principal Manifolds," *Machine Learning*, 1999.

\* cited by examiner

*Primary Examiner*—Mark Zimmerman
*Assistant Examiner*—Peter-Anthony Pappas
(74) *Attorney, Agent, or Firm*—Dirk Brinkman; Andrew J. Curtin

(57) ABSTRACT

A method determines mappings between high-dimensional measured samples and a reduced-dimensional manifold. Samples are acquired of a physical system. The samples have a high number of dimensions. A low number of dimensions are determined for a manifold embedded in a space of the high-dimensional samples. Local charts having the dimensions of the low number of dimensions of the manifold are fitted to selected high-dimensional samples. The charts are then connected to determine a forward mapping from any high-dimensional sample to a coordinate on the manifold and a reverse mapping from any coordinate on the manifold to a corresponding point in high-dimensional sample space.

16 Claims, 4 Drawing Sheets

METHOD FOR MAPPING HIGH-DIMENSIONAL SAMPLES TO REDUCED-DIMENSIONAL MANIFOLDS

FIELD OF THE INVENTION

This invention relates generally to sample analysis, and more particularly to reducing the dimensionality of high-dimensional sample spaces and mapping the samples to a lower dimensional sample space.

BACKGROUND OF THE INVENTION

It is often the case that a physical system or object having a modest number of degrees of freedom is measured with an apparatus that has many more degrees of freedom than the system or object. For example, a human face has a few hundred (d) degrees of freedom, while a single digital mega-pixel image of the human face has many million (D) degrees of freedom, for example, i.e., at least three color intensities for each pixel, and thus d<<D.

The space of all possible images of varied facial expressions is thus a low-dimensional manifold embedded in the high-dimensional sample space of all possible digital images. Herein, a manifold is exemplified by a smooth 2D surface embedded in a 3D space (coordinate system), and more generally defined as a connected subregion of a high-dimensional space that can be flattened to yield a lower-dimensional space that preserves the connectivity structure of local neighborhoods in the subregion.

In the context of the present invention, a manifold is a representation of all possible configurations of a measured physical system or object. For example, embedded in the high-dimensional space of all possible images of a hand there is a 22-dimensional manifold representing all possible joint angles. The invention shows how to estimate and use this manifold and its embedding from a finite number of measurements, e.g., a set of digital images.

In the field of mathematics known as differential geometry, charting is known as the problem of assigning a local low-dimensional coordinate system to every point on a manifold whose geometry is known analytically, e.g., characterized by mathematical formulae. Of particular interest is the case where these local charts can be connected to give a globally consistent chart, which assigns a unique low-dimensional coordinate.

In the present invention, it is shown how to perform analogous operations on measured data in a high-dimensional sample space of real-world physical systems. The invention uses the chart to edit, visualize or render, compress, de-noise, and otherwise manipulate the measured signal while preserving the fidelity of the results.

With charting, it is presumed that the data lie on or near some low-dimensional manifold embedded in the sample space, and that there exists a one-to-one smooth non-linear transform between the manifold and a low-dimensional vector space.

It is desired to estimate smooth continuous mappings between the sample and coordinate spaces. Often this analysis sheds light on intrinsic variables of the data-generating phenomenon, for example, revealing perceptual or configuration spaces.

Topology-neutral non-linear dimensionality reduction processes can be divided into those that determine mappings, and those that directly determine low-dimensional embeddings.

DeMers et al., in "Nonlinear Dimensionality Reduction," *Advances in Neural Information Processing Systems*, Volume 5, 1993, described how auto-encoding neural networks with a hidden layer "bottleneck," can be used to effectively cast dimensionality reduction as a compression problem.

Hastie et al., defined principal curves as non-parametric ID curves that pass through the center of "nearby" data samples in "Principal Curves," *J. Am. Statistical Assoc*, 84(406):502–516, 1989.

A number of known methods properly regularize that approach and extend it to surfaces, see Smola et al., in "Regularized Principal Manifolds," *Machine Learning*, 1999. They provided an analysis of such methods in the broader framework of regularized quantization methods, and developed an iterative process as a means of investigating sample complexity.

A number of significant advances have been made recently in embedding processes. Gomes et al., in "A variational approach to recovering a manifold from sample points," *Proc. ECCV*, 2002, treated manifold completion as an anisotropic diffusion problem where sample points are iteratively expanded until they connect to their neighbors.

The ISOMAP process represented remote distances as sums of a trusted set of distances between immediate neighbors, and used multi-dimensional scaling to determine a low-dimensional embedding that minimally distorts all distances, see Tenenbaum et al., "A Global Geometric Framework For Nonlinear Dimensionality Reduction," *Science*, 290:2319–2323, Dec. 22, 2000.

A locally linear embedding (LLE) method represented each sample point as a weighted combination of its trusted nearest neighbors, then determined a low-dimensional embedding that minimally distorted these barycentric coordinates, see Roweis et al., "Nonlinear Dimensionality Reduction By Locally Linear Embedding," *Science*, 290:2323–2326, Dec. 22, 2000.

Those methods have complementary strengths: ISOMAP handles missing data well but fails if the data hull are non-convex; and vice versa for the LLE method. Both offer embeddings without mappings. However, trusted-set methods are vulnerable to noise because they only consider the subset of point-to-point relationships that tend to have the lowest signal-to-noise relationship. It is known that trusted methods can be unstable because small changes to the size of the trusted neighbor set can induce large changes in the set of constraints that the low-dimensional embedding must satisfy.

In a return to mapping, Roweis et al., in "Global coordination of linear models, "*Advances in Neural Information Processing Systems*," Volume 13, 2002, described global coordination. In that method, a mixture of locally linear projections from sample to coordinate space are learned. They devised a posterior probability measure that penalizes distortions in the mapping, and gave an expectation-maximization (EM) rule for locally maximizing the posterior probability.

That work heralded an intriguing new use of variational methods to learn representations, but also highlighted the difficulty of even hill-climbing their multi-modal posterior probability.

It is desired to provide a method for charting a manifold that is a closed-form solution and avoids hill-climbing a non-uniform posterior probability, and to find mappings between sample space and charting space.

SUMMARY OF THE INVENTION

The invention provides non-linear forward and reverse mappings between a high-dimensional (D) sample space and a low-dimensional (d) manifold. The mappings effectively recover a Cartesian coordinate system for the manifold from which the data are sampled. The mappings preserve local distances and angles in the manifold, and are pseudo-invertible, smooth, continuous and well-behaved in the presence of sampling bias and noise.

The invention estimates an intrinsic low dimensionality of the manifold, decomposes the data sample into locally linear low-dimensional patches or "charts," merges these charts into a single low-dimensional coordinate system, and determines forward and reverse mappings between the sample and coordinate spaces. All solutions are unique, optimal, and of a closed form.

First, the intrinsic dimensionality (d) of the measured data manifold is estimated from a growth process of point-to-point distances. Then the invention treats the d-dimensional charting problem from the perspective of minimizing information loss. Then, the problem of mapping data-points to a vector space or manifold is performed by parameterizing a kernel-based mixture of linear projections. The posterior probability combines a standard Gaussian mixture model (GMM) likelihood function with a prior probability that penalizes uncertainty in the locations of a projected point due to inconsistent projections.

For the special case where the posterior probability is unimodal and maximizable in closed form, the invention provides a GMM whose covariances reveal local linear subspaces on the manifold. With the invention method, any GMM and choice of reduced dimension d has a unique, closed-form solution for a minimal-distorting non-linear forward projection of the data from the sample space to the d-dimensional coordinate space, as well as an inverse mapping defining the surface of the manifold in the sample space.

In analogy to differential geometry, the subspaces are called "charts" and their merger the "connection." The method can be used to untie knots, unroll and untwist sheets, and to visualize, compress and model high-dimensional bio-mechanical data, such as digital images of human body parts.

DETAILED DESCRIPTION OF THE PREFERRED EMBODIMENT

Figure 1:
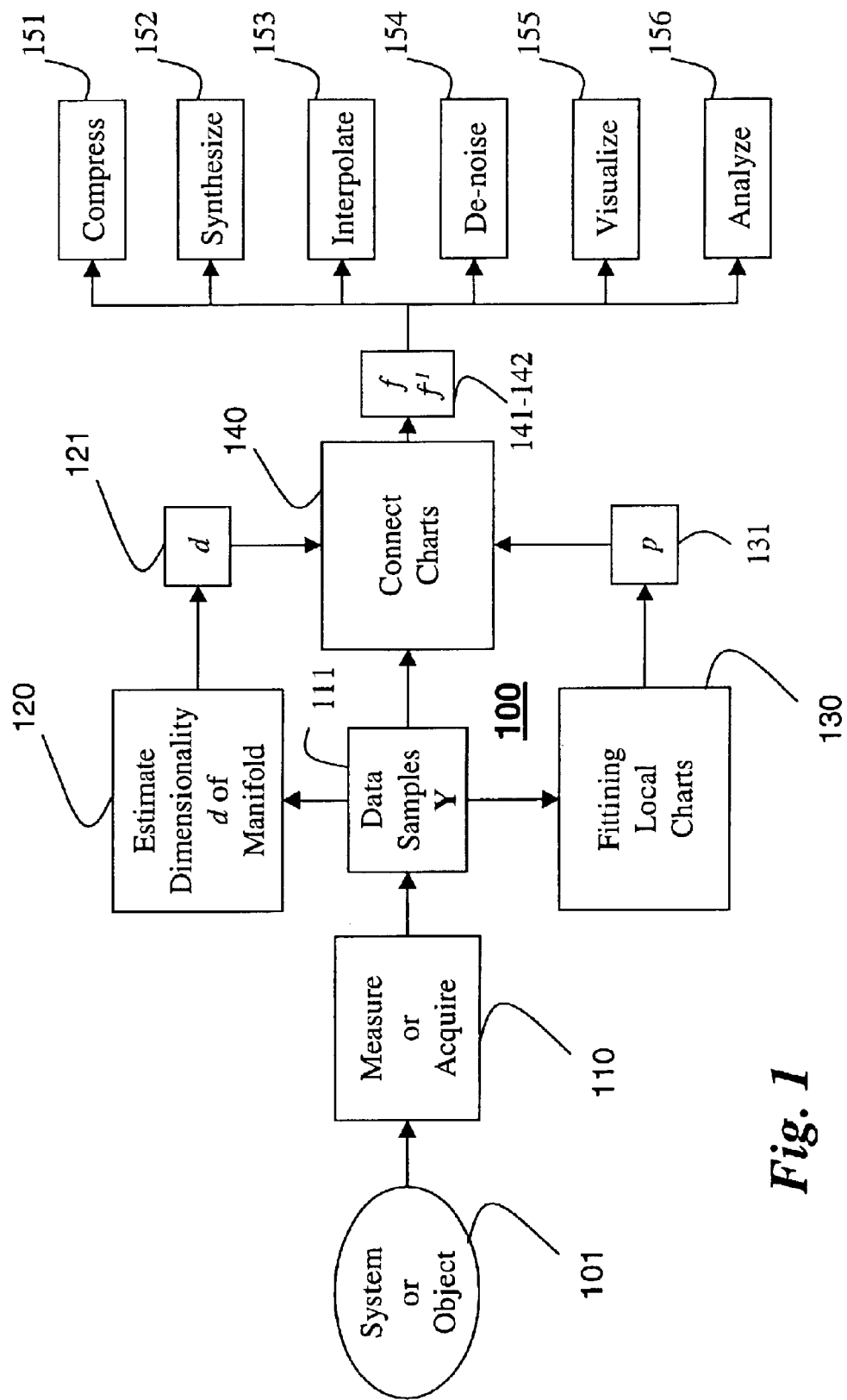
FIG. 1 is a flow diagram of a method for representing high-dimensional measured data samples by reduced-dimensional manifolds.

A method 100 according to the invention begins by measuring or otherwise acquiring 110 samples Y 111 of a physical system or object 101. For example, the samples 111 are pixel intensities in a digital image of a face.

The space (coordinate system) of the samples characteristically has a very high number (D) of dimensions. The invention provides a method for constructing a low-dimensional (d) manifold which approximates the distribution of data points in the sample space, and determining the intrinsic d-dimensional coordinate system of the manifold. The coordinate system is assigned so that every point on the manifold has a unique low-dimensional set of ordinates, and nearby points have similar ordinates.

The method also produces functions $f$ and $f^{-1}$ 141–142 that respectively map forward and backward between the original high-dimensional sample space and the low-dimensional coordinate system of the manifold. These mapping functions support operations such as signal compression, de-noising, interpolation, extrapolation, and synthesis 151–156, described in further detail below.

If the samples are pixel intensities in a digital image of a human faces, then the images can be represented by the low-dimensional coordinates of their corresponding points on the manifold, allowing high-resolution images to be represented with a just few hundred numbers. In other words, the sample space or images are greatly compressed 151. Furthermore, images of arbitrary facial expressions can be synthesized 152 from arbitrary points on the manifold.

A path on the manifold connecting two points representing two facial expressions give a sequence of facial images that interpolates 153 between the two expressions, producing a physically plausible video. A straight line in the recovered coordinate system gives one such path. However, a straight line connecting two points in the measured image space gives a useless sequence of blends between the two images.

The method can also be used to correct 154 a noisy or corrupted samples, e.g. images. Such images are points in image space that do not lie on the manifold. To de-noise a corrupted image, find a closest point on the manifold to the corrupted data, and synthesize a corresponding image pixel from that point.

The distribution of all samples, e.g., images, can be visualized (rendered) 155 in 2D or 3D by plotting each sample point according to the first two or three ordinates of its manifold coordinates. This can reveal trends and groupings that are impossible to see in the original sample space.

Statistical analyses 156 that are not tractable in the original high-dimensional sample space become feasible in the low-dimensional coordinate system of the manifold.

Estimating Locally Linear Scale and Intrinsic Dimensionality

As stated above, the invention begins with matrix of measured or otherwise acquired sample points Y 111 of a physical system or object 101. For example, the sample points are pixel intensity values of digital images. The matrix is represented by $Y = [y_1, \ldots, y_N]$, $y_n \in \in^D$ populating a D-dimensional sample space, where D is very large, $10^6 << D$. It is desired to fit a d-dimensional manifold M to this sample space so that d<<D, e.g. $d=10^2$ for a reduction of approximately four orders of magnitude.

The invention finds a non-linear forward projection $f$ 141 to a subspace $G(Y) \rightarrow X = [x_1, \ldots, x_N]$, $x_n = \epsilon \in^d$, and a one-to-one inverse map $f^{-1}$ 142

$G^{-1}(X) \rightarrow Y$ such that local relations between nearby points on the manifold are preserved. It is desired that the forward map G is non-catastrophic, that is, smooth continuous and without sharp folds. Parallel lines on the manifold in $\in^D$ should map to continuous smooth non-intersecting curves in $\in^d$.

Smoothness means that at some scale r the mapping from a neighborhood on M to $\in^d$ is effectively linear. As one approaches the limit of infinite noiseless samples, finding r is done as follows.

Consider a sphere of radius r centered on an arbitrary data point. Let $\Sigma_r$ be the covariance of the $n_r$ points within that sphere. On the true manifold, both $n_r$ and the volume of $\Sigma_r$ grow as the radius $r_d$ of the sphere increases, and therefore at very small scales the rank of $\Sigma_r$ is d.

When dealing with finite samples, the scale at which the manifold is locally linear is the interval $0 \leq r \leq R$ for which rank $(\Sigma_r) \leq d$. At larger scales the curvature of the embedded manifold inflates the rank. This is complicated by the presence of sample noise of standard deviation $\sigma$; for $0 \leq r \leq \sigma$, rank$(\Sigma_r)=D>d$. In practical settings, linearity is obtained in the scale interval $\sigma \leq r \leq R$.

Figure 2:
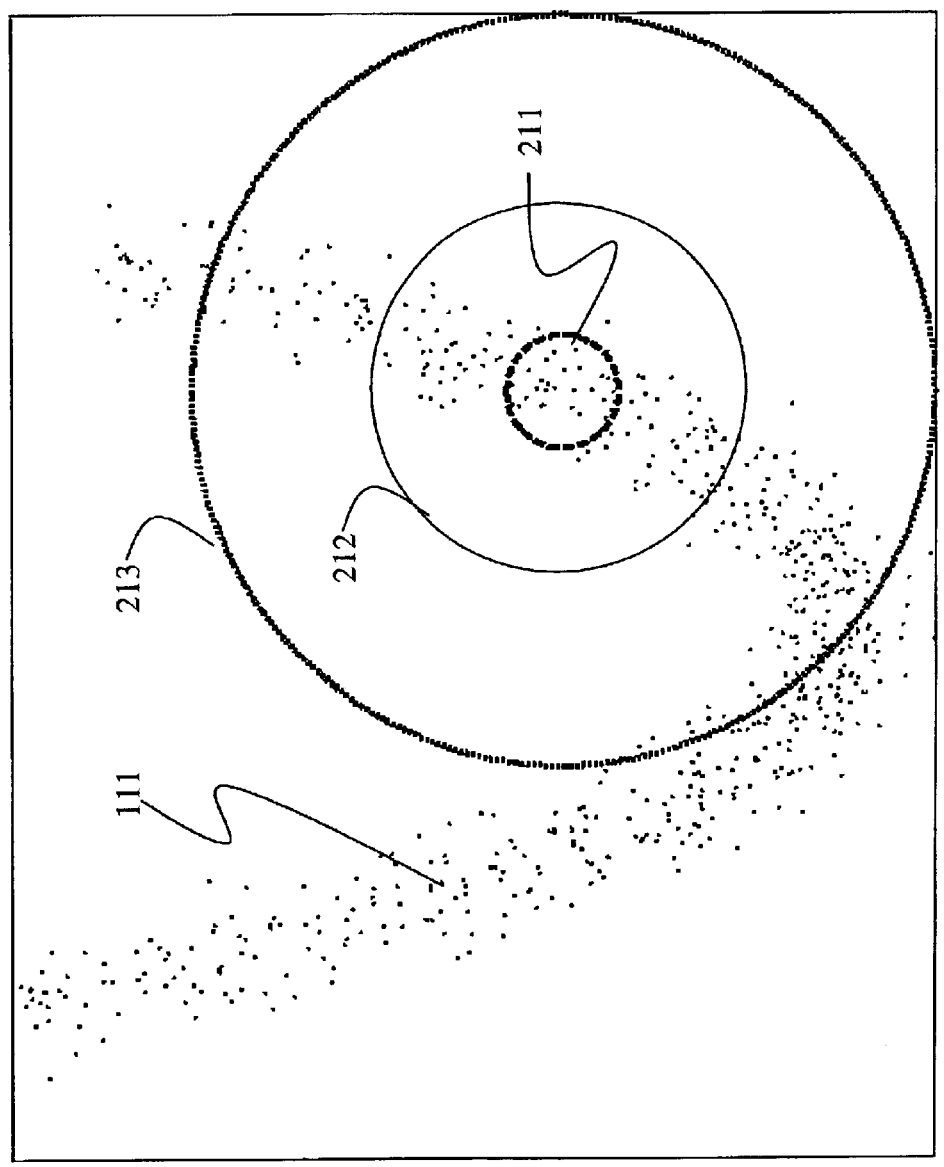
FIG. 2 is a graph of a point-count growth process.

The immediate problem is to estimate r not knowing $\sigma$ or R. From the volume growth process, the determinant $|\Sigma_r| \propto r^d$. Thus it follows that there exists a scale interval in which $v(r) = d/d_r \log|\Sigma_r|$ satisfies $v(r) = d/r$. For reasons of computational and sample complexity, tracking the growth of the covariance at every point is not a practical procedure. However, it is practical to track the point-count growth process $c(r) = d\log r/d \log n_r$ which behaves similarly and peaks at $c(r) = 1/d$ when r is at the locally linear scale. The point-count growth process on a 1D manifold noisily embedded in a 2D space is shown in FIG. 2 where the samples 111 are dots.

Figure 3:
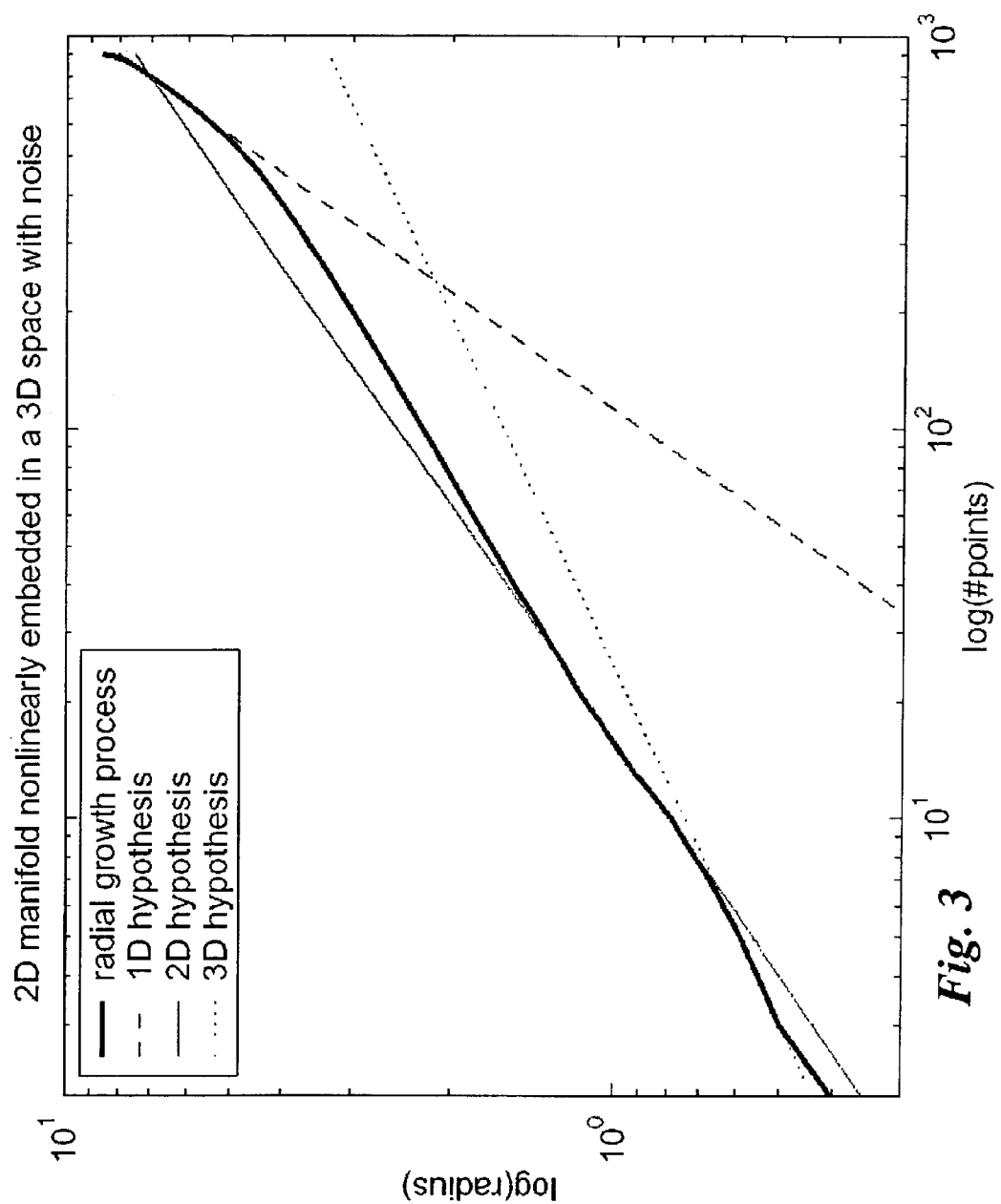
FIG. 3 is a graph comparing slopes of growth curves.

Characteristic curves of the process are shown in FIG. 3 for radial growth and 1D-3D hypothesises. The point-count growth process is used to find the intrinsic dimensionality of a 2D manifold in three -space. Lines of slope 1/3, 1/2, and 1/1 are fitted to sections of the log $r/\log n_r$ curve. For neighborhoods of radius $r\sim1$ with roughly $n\approx10$ points, the slope peaks at 1/2 indicating a dimensionality of d=2. Below that, the data appears 3D because it is dominated by noise, except for $n \leq D$ points. Above, the data appears as >2D because of manifold curvature. As the r-sphere expands to cover the entire data-set the dimensionality appears to drop to 1 as the process begins to track the edges of the sheet.

At sub-noise scales 211, $c(r<\sigma)\approx1/D<1/d$, because noise has distributed points in all directions with equal probability. At the locally linear scale 212, $c(r)=1/d$, because points are distributed only in the directions of the local tangent space of the manifold. At the scale 213 at which curvature becomes significant, $c(r>R)<1/d$, because the manifold is no longer perpendicular to the surface of the sphere, so the sphere does not have to grow as fast to accommodate new points.

Therefore, the maximum slope of $c(r)$ gives a good estimate of the local dimensionality d of the manifold, provided that the sphere has not expanded to a manifold boundary, i.e., edges and corners, because the boundary has lower dimension than the manifold. Even for low-dimensional manifolds such as sheets, the boundary manifolds are very small relative to the full manifold, so the boundary effect is typically limited to a small rise in $c(r)$ as r approaches the scale of the entire sample space. In practice, the method according to the invention simply expands a sphere of radius r at every point or a random selection of points and looks for the first peak in $c(r)$. The values d and r can be estimated globally, per-point.

Fitting Local Charts

Figure 4:
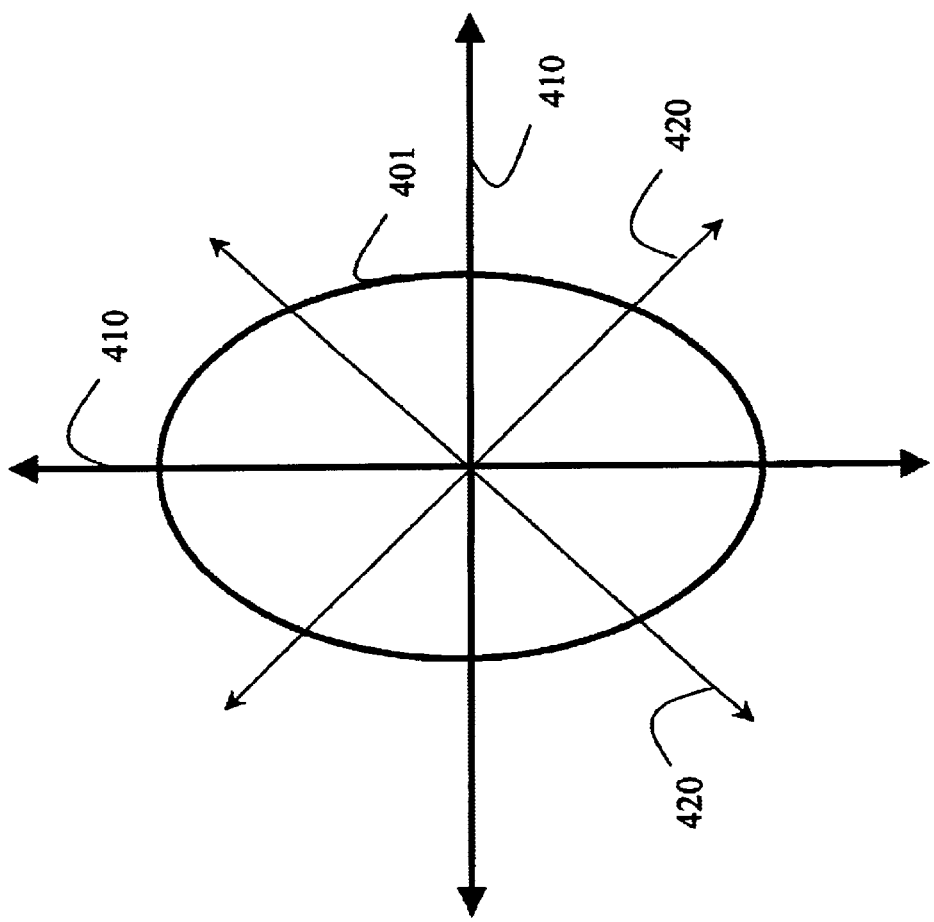
FIG. 4 is a block diagram of a chart.

For the charting fitting step 130, the method 100 finds a soft partitioning of the data samples into neighborhoods N 131. As shown in FIG. 4, the charts can be expressed as a Gaussian, or elliptically shaped sphere 401, with the dominant axes 410 lying in the plane of the manifold, and the minor axis 420 perpendicular to the manifold. The charts are locally linear and low-dimensional, in the sense that the data project into a subspace associated with each neighborhood with (1) minimal loss of variance and (2) maximal agreement of the projections of nearby points into nearby neighborhoods. Criterion (1) is expressed by maximizing the likelihood function p of a Gaussian mixture model (GMM) density fitted to the data samples:

$$p(y_i \mid \mu\Sigma) \doteq \sum_j p(y_i \mid \mu_j, \Sigma_j)p_j = \sum_j \mathcal{N}(y_i; \mu_j, \Sigma_j)p_j. \qquad (1)$$

Each Gaussian component defines a local neighborhood N centered around $\mu_j$ with axes defined by the eigenvectors of $\Sigma_j$. The amount of data variance along each axis is indicated by the eigenvalues of $\Sigma_j$. If the manifold is locally linear in the vicinity of the $\mu_j$, then all but the d dominant eigenvalues are near-zero. This implies that the associated eigenvectors constitute the optimal variance-preserving local coordinate system.

To some degree likelihood maximization naturally realize this property. Likelihood maximization requires that the GMM components shrink in volume to fit the data as tightly as possible. This shrinking is best accommodated by positioning the components so that they project onto locally flat collections of data points. However, this is easily violated by degenerate zero-variance GMM components or components fitted to small enough locales so that data density not on the manifold is comparable to density on the manifold, e.g., at the noise scale. Consequently a prior probability is needed.

Criterion (2) implies that neighboring partitions should have dominant axes that span similar subspaces, because disagreement, i.e., large subspace angles, would lead to inconsistent projections of the same point and therefore uncertainty about its location in low-dimensional coordinate space. The principal insight is that criterion (2) is exactly the cost of coding the location of a point in one neighborhood when it is generated by another neighborhood. The cross-entropy between the Gaussian models defining the two neighborhoods is $$D(\mathcal{N}_1 \| \mathcal{N}_2) = \int dy\, \mathcal{N}(y; \mu_1, \Sigma_1) \log \frac{\mathcal{N}(y; \mu_1, \Sigma_1)}{\mathcal{N}(y; \mu_2, \Sigma_2)} \qquad (2)$$

$$= \log|\Sigma_1^{-1}\Sigma_2| + \text{trace}(\Sigma_1^{-1}\Sigma_2) + \qquad (3)$$

$$(\mu_1 - \mu_2)^T \Sigma_1^{-1}(\mu_1 - \mu_2) + D/2.$$

Roughly speaking, the terms on the second line measure differences in size, orientation, and position of the charts 131, respectively, of two coordinate frames located at the means $\mu_1, \mu_2$ with axes specified by the eigenvectors of $\Sigma_1, \Sigma_2$. All three terms decline to zero as the overlap between the two frames is maximized. To maximize consistency between adjacent neighborhoods, the prior a. $p(\mu, \Sigma) = \exp-\Sigma_{l \neq j} m_l(y_l) D(N_1 \| N_2)$, where $m_i(y_j)$ is a measure of co-locality.

The dominant axes in the neighboring charts 131 do not need to aligned, they only need to span nearly the same subspace. This is a much easier objective to satisfy, and it contains a useful special case where the posterior $p(\mu,\Sigma|Y) \propto \Sigma_i p(y_i|\mu\Sigma) p(\mu;\Sigma)$ is unimodal and can be maximized in closed form.

A Gaussian neighborhood chart is associated with each data-point, setting $\mu_i = y_i$. All neighborhoods are taken to be a priori equally probable, setting $p_i = 1/N$, and define the co-locality measure $m_i(y) \propto N(y; y_i; \sigma_2)$, with the scale parameter $\sigma$ specifying the expected size of a neighborhood on the manifold in sample space. A reasonable choice is $\sigma = r/2$, so that $2\text{erf}(2) > 99.5\%$ of the density of $m_i(y)$ is contained in the area around $y_i$ where the manifold is expected to be locally linear. With $\mu_i$, $p_i$ and $m_i(y)$ fixed, the MAP estimates of the GMM covariances are $$\Sigma_i = \sum_j m_i(y_j)((y_j - \mu_i)(y_j - \mu_i)^T + \qquad (4)$$

$$(\mu_j - \mu_i)(\mu_j - \mu_i)^T + \Sigma_j) / \sum_j m_i(y_j)$$

Note that each covariance $\Sigma_i$ is dependent on all other $\Sigma_j$. The MAP estimators for all covariances can be arranged into a set of fully constrained linear equations and solved exactly for their mutually optimal values. This key step brings non-local information about the shape of the manifold into the local description of each neighborhood.

This step also ensures that adjoining neighborhoods have similar covariances, and thus small angles between their respective subspaces, particularly subspaces of dimension d or higher. Even if the local set of data points are dense in a direction perpendicular to the manifold, the local charts orient parallel to the manifold as part of a globally optimal solution.

Connecting the Charts

The next step 140 constructs a connection for any set of charts specified as an arbitrary non-degenerate GMM. The GMM yields a soft partitioning of the dataset into neighborhoods of mean $\mu_k$ and covariance $\mu_k$. The optimal variance-preserving low-dimensional coordinate system for each neighborhood derives from its weighted principal component analysis, which is exactly specified by the eigenvectors of its covariance matrix.

Eigendecompose $V_k \Lambda_k V^T_k \leftarrow \Sigma_k$ with eigenvalues in descending order on the diagonal of $\Lambda_k$, and define the chart projection $W_k \doteq [I_d, 0] V^T_k$, which extracts the eigenvectors in $V_k$ corresponding to the d dominant eigenvalues.

Define per-chart probability $p_{y|k}(y) V^T_k \doteq N(y; \mu_k, \Sigma_k)$, local chart coordinate $\mu_{ki} = W_k(y_i - \mu_k)$, and let $U_k = (U_{k1}, \ldots, U_{kN})$ be the local coordinates of all points in chart k.

The goal is to connect all charts into a globally consistent low-dimensional coordinate system. For each chart, there is a low-dimensional affine transform $G_k$ that projects $U_k$ into the global coordinate system. Integrating over all charts, the weighted average of the projections of point $y_i$ into the low-dimensional vector space is $$\widehat{x | y} \doteq \qquad (5)$$

$$\sum_j G_j \begin{bmatrix} W_j(y - \mu_j) \\ 1 \end{bmatrix} p_{y|j}(y) p_j \Rightarrow \widehat{x_i | y_i} \doteq \sum_i G_j \begin{bmatrix} u_{ji} \\ 1 \end{bmatrix} p_{y|j}(y_i) p_j.$$

If a point has non-zero probabilities in two charts, then the affine $$G \doteq [G_1, \cdots, G_K] \qquad (6)$$

$$= \arg\min_{G_k, G_j} \sum_i p_{y|k}(y_i) p_{y|j}(y_i) p_k p_i \left\| G_k \begin{bmatrix} u_{ki} \\ 1 \end{bmatrix} - G_j \begin{bmatrix} u_{ji} \\ 1 \end{bmatrix} \right\|^2_F$$

transforms of those two charts maps the point to the same place in coordinate space.

This can be set up as a weighted least-squares problem solved in closed form. Equation (6) generates a homogeneous set of equations that uniquely determines a solution up to an affine transform of G.

For the moment, pick one neighborhood and locate it at the center, thereby eliminating the affine indeterminacy. This adds the constraint $$G_1 = (I, 0)^T.$$

To solve, define an indicator matrix $F_k \doteq (0, \ldots, 0, I, 0, \ldots, 0)^T$ with the identity matrix occupying the $k^{th}$ block, such that $G_k = GF_k$.

Let $P_k \doteq \text{diag}([p_{y|k}(y_1), \ldots, p_{y|k}(y_N)] p_k)$ contain the per-chart probability of all points on its diagonal. The squared error is then $$\sum_k \left[ \Phi\left(G \underline{U}_k - \begin{bmatrix} U_1 \\ 0 \end{bmatrix}\right) P_k P_1 \right) + \sum_{j \neq k} \Phi(G \underline{U}_j - G \underline{U}_k) P_j P_k \right], \qquad (7)$$

where $$\underline{U}_k \doteq F_k \begin{bmatrix} U_k \\ 1 \end{bmatrix}$$

and $\Phi(X) \doteq \|X\|_F^2 = \text{trace}(X^T X)$. The first $\Phi(\cdot)$ term penalizes inconsistency with the anchor chart and the $\Phi(.)$ second term penalizes all other pair-wise patch inconsistencies. Differentiating with respect to G, $$\frac{d}{dG} = \sum_k \left[ 2 \underline{U}_k P_k^2 P_1^2 \underline{U}_k^T G^T - 2 \underline{U}_k P_k^2 P_1^2 \begin{bmatrix} U_1 \\ 0 \end{bmatrix}^T + \qquad (8)$$

$$\sum_{j \neq k} (\underline{U}_k - \underline{U}_j) P_k^2 P_j^2 (\underline{U}_k - \underline{U}_j)^T G^T \right]$$

$$G^T = \qquad (9)$$

$$\left( \sum_k \underline{U}_k P_k^2 \left( \sum_{j \neq k} P_j^2 \right) \underline{U}_k^T - \sum_{j \neq k} \underline{U}_k P_k^2 P_j^2 \underline{U}_j^T \right)^{-1} \left( \sum_k \underline{U}_k P_k^2 P_1^2 \begin{bmatrix} U_1 \\ 0 \end{bmatrix}^T \right)$$

Now, remove the dependence on an arbitrary reference neighborhood $$G = \arg\min_G \sum_{j \neq k} \Phi(G \underline{U}_j - G \underline{U}_k) P_j P_k \qquad (10)$$

$$= \arg\min_G \Phi(GQ)$$

$$= \arg\min_G \text{trace} GQQ^T G^T$$

$G_1$ by combining the two $\Phi(.)$ terms in equation 7, where $Q = \Sigma_{t \neq j} U_j U_k P_j P_k$. If the requirements is that $GG_T = I$ to prevent degenerate solutions, then equation 10 is solved, up to an arbitrary rotation in coordinate space, by setting $G^T$ to the eigenvectors associated with the smallest eigenvalues of $QQ_T$.

The eigenvectors can be determined efficiently without explicitly forming $QQ^T$. Other numerical efficiencies derive from the fact that most of the probabilities in each $P_k$ are vanishingly small.

After the connection is solved, equation (5) gives the forward projection $f$ 141 of any point y into coordinate space. There are several numerically distinct candidates for the backprojection $f^{-1}$ 142, posterior mean, mode, or exact inverse. Noting that chart-wise projection defines a complementary density in global chart space $$p_{x|k}(x) = \mathcal{N}\left(x; G_k \begin{bmatrix} 0 \\ 1 \end{bmatrix}, G_k \begin{bmatrix} [I_d, 0]\Lambda_k[I_d, 0]^T & 0 \\ 0 & 0 \end{bmatrix} G_k^T\right),$$

and the back-projection of x into neighborhood k on the surface of the manifold, p(y|x,k), is a Dirac delta whose mean is a linear function of x.

Under this assumptions, the posterior mean map from low-dimensional coordinate space to high-dimensional data space is obtained by integrating out uncertainty over which chart generates x:

$$\hat{y}|x = \sum_k p_{x|k}(x) p_k \left( \mu_k + W_k^T \left( G_k \begin{bmatrix} I \\ 0 \end{bmatrix} \right)^+ \left( x - G_k \begin{bmatrix} 0 \\ 1 \end{bmatrix} \right) \right). \quad (11)$$

where $X^+$ denotes pseudo-inverse. In general, this back-projecting function does not reconstruct the original points. Instead, it generates a surface that passes through the weighted average of the $\mu_i$ of all the neighborhoods in which $y_i$ has non-zero probability, much like a principal curve passes through the center of each local group of points.

EFFECT OF THE INVENTION

The invention breaks the problem of kernel-based dimensionality reduction into three steps: first, estimate a locally linear scale and intrinsic dimensionality, second find a set of data point-centered on locally linear neighborhoods or "charts" such that adjoining charts span maximally similar subspaces, and third determine a minimal distortion merger or "connection" of all charts.

Steps two and three have Bayesian settings, but by offloading the non-linearity onto the kernels, these steps become least-squares problems, solvable in closed form. Charting according to the invention performs well on data samples where the signal-to-noise ratio confounds state-of-the-art methods.

There are two possible reasons for this. First, some non-local information is used to construct the system of charts and their connection, and second the mapping only preserves the component of local point-to-point relationships that project onto the manifold; relationships perpendicular to the manifold are discarded. The first reason can be understood as a smoothness bias that makes the charting more robust to noise, and the second reason has a simple and direct analogy to noise-suppression by principle component analysis.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for determining mappings between high-dimensional measured samples and a reduced-dimensional manifold, comprising:

acquiring samples of a physical system, the samples having a high number of dimensions;

determining a low number of dimensions of a manifold embedded in a space of the high-dimensional samples;

fitting local charts having the dimensions of the low number of dimensions of the manifold to selected high-dimensional samples, wherein each chart is represented by an elliptically shaped sphere with a set of dominant axes lying in a plane of the manifold, and a set of minor axis perpendicular to the manifold; and connecting the charts to determine a forward mapping from any high-dimensional sample to a coordinate on the manifold and a reverse mapping from any coordinate on the manifold to a corresponding point in high-dimensional sample space.

2. The method of claim 1 wherein the number of dimensions of the manifold is substantially less than the number of dimensions of the samples.

3. The method of claim 1 further comprising:

estimating the number of dimensions of the manifold from the samples.

4. The method of claim 1 wherein the mappings between the sample space and the coordinate space are estimated from a Gaussian mixture model.

5. The method of claim 4 wherein the Gaussian mixture model is fitted to maximize an overlap between neighboring mixture components by minimizing cross-entropies.

6. The method of claim 4 wherein the Gaussian mixture model is fitted near each sample.

7. The method of claim 1 further comprising:

acquiring the samples from an image of a face.

8. The method of claim 1 further comprising:

compressing the samples by the forward mapping.

9. The method of claim 1 further comprising:

synthesizing new samples by the forward mapping.

10. The method of claim 1 further comprising:

interpolating between the samples using by the forward mapping.

11. The method of claim 1 further comprising:

removing noise from the samples using the forward and reverse mappings.

12. The method of claim 1 further comprising:

rendering the samples using the forward mapping.

13. The method of claim 1 further comprising:

analyzing the samples using the forward and reverse mappings.

14. The method of claim 7 further comprising:

synthesizing an arbitrary facial expressions using the forward and reverse mappings.

15. The method of claim 1 wherein the number of dimensions of the samples is D and the number of dimensions of the manifold is d, and $10^6 << D$ and $d \sim 10^2$ for a reduction of approximately four orders of magnitude.

16. The method of claim 1 wherein the manifold is smooth, and continuous.

* * * * *